US012801939B2

(12) United States Patent
Madasu et al.

(10) Patent No.: US 12,801,939 B2
(45) Date of Patent: Nov. 17, 2026

(54) MODEL BASED PREFERENCE LEARNING AND OPTIMIZATION SYSTEMS AND METHODS

(71) Applicant: LANDMARK GRAPHICS CORPORATION, Houston, TX (US)

(72) Inventors: Srinath Madasu, Houston, TX (US); Keshava Prasad Rangarajan, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 1327 days.

(21) Appl. No.: 17/624,974

(22) PCT Filed: Aug. 9, 2019

(86) PCT No.: PCT/US2019/045974

§ 371 (c)(1),
(2) Date: Jan. 5, 2022

(87) PCT Pub. No.: WO2021/029858

PCT Pub. Date: Feb. 18, 2021

(65) Prior Publication Data

US 2022/0284310 A1 Sep. 8, 2022

(51) Int. Cl.
*G06N 5/02* (2023.01)
*G06F 17/18* (2006.01)

(52) U.S. Cl.
CPC ............... *G06N 5/02* (2013.01); *G06F 17/18* (2013.01)

(58) Field of Classification Search
CPC ................................. G06F 17/18; G06N 5/02
See application file for complete search history.

(56) References Cited

U.S. PATENT DOCUMENTS

| | | | |
|---|---|---|---|
| 9,085,958 B2 | 7/2015 | Laing et al. | |
| 2015/0247396 A1 | 9/2015 | Tunc et al. | |
| 2017/0343969 A1* | 11/2017 | Dykstra | E21B 44/005 |
| 2019/0032467 A1 | 1/2019 | Wang et al. | |
| 2019/0234207 A1 | 8/2019 | Subramaniyan et al. | |

FOREIGN PATENT DOCUMENTS

| | | |
|---|---|---|
| EP | 2090742 A1 | 8/2009 |

OTHER PUBLICATIONS

González, J., Dai, Z., Damianou, A., & Lawrence, N. D. (Jul. 2017). Preferential bayesian optimization. In International Conference on Machine Learning (pp. 1282-1291). PMLR. (Year: 2017).*
Cavagnaro, D. R., Pitt, M. A., Gonzalez, R., & Myung, J. I. (2013). Discriminating among probability weighting functions using adaptive design optimization. Journal of risk and uncertainty, 47(3), 255-289. (Year: 2013).*

(Continued)

*Primary Examiner* — Bijan Mapar
(74) *Attorney, Agent, or Firm* — NOVAK DRUCE CARROLL LLP

(57) ABSTRACT

A model optimizer for predicting a drill bit variable can select a model from multiple models based on a learned preference. The preference may be updated according to preference indicator received from a user in response to an output model selection.

20 Claims, 5 Drawing Sheets

(56) References Cited

OTHER PUBLICATIONS

Snoek, J., Rippel, O., Swersky, K., Kiros, R., Satish, N., Sundaram, N., . . . & Adams, R. (Jun. 2015). Scalable bayesian optimization using deep neural networks. In International conference on machine learning (pp. 2171-2180). PMLR. (Year: 2015).*

International Search Report and Written Opinion for International application No. PCT/US2019/045974, mailed May 8, 2020, 9 pages.

Berkenkamp, Felix et al.; Bayesian Optimization with Safety Constraints: Safe and Automatic Parameter Tuning in Robotics; arXiv:1602.04450v2; Mar. 2, 2018; 22 pages.

Snoek, Jasper et al.; Scalable Bayesian Optimization Using Deep Neural Networks; arXiv:1502.05700v2; Jul. 13, 2015; 13 pages.

* cited by examiner

MODEL BASED PREFERENCE LEARNING AND OPTIMIZATION SYSTEMS AND METHODS

CROSS-REFERENCE TO RELATED APPLICATIONS

This application is a national stage entry of PCT/US2019/045974 filed Aug. 9, 2019, said application is expressly incorporated herein in its entirety.

TECHNICAL FIELD

The present technology pertains to optimizing controllable parameters for drilling. In particular, the present technology pertains to model based optimization for controllable parameter tuning.

BACKGROUND

In the oil and gas industry, drilling is often performed by orienting a drill bit in order to achieve a particular rate of penetration (ROP). In many cases, the ROP can vary depending on the borehole environment (e.g., surrounding regolith, etc.) and various controllable drill bit variables such as a weight on bit (WOB) or a rotations per minute (RPM) of the drill bit. A relationship between the controllable drill bit variables and the ROP can be modeled based on historical drilling data from other wells and/or based on live data from previous spans of drilling a single borehole.

However, various models may predict differing ROP values based on the same WOB and RPM values based on the assumptions of the models. In many cases, one model of multiple models is selected for use in controlling the drill bit based on various sensor signals (e.g., prioritizing one model or another based on a particular sensor signal) or learned over a course of time. In cases where a model selection is learned over a course of time, a lengthy learning process based on matching predictions to outcomes and updating accordingly can take considerable time and may introduce substantial room for error as the model selection process iterates. On many oil and gas sites, even the smallest error can cause severe delays in drilling (e.g., to damaged equipment, etc.) and even possible physical harm to workers onsite. As a result, the knowledge of an experienced user applying experiential and difficult to replicate knowledge can be useful in identifying a preferred model to use for controlling the drill bit.

It is with these observations in mind, among others, that aspects of the present disclosure were concerned and developed.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
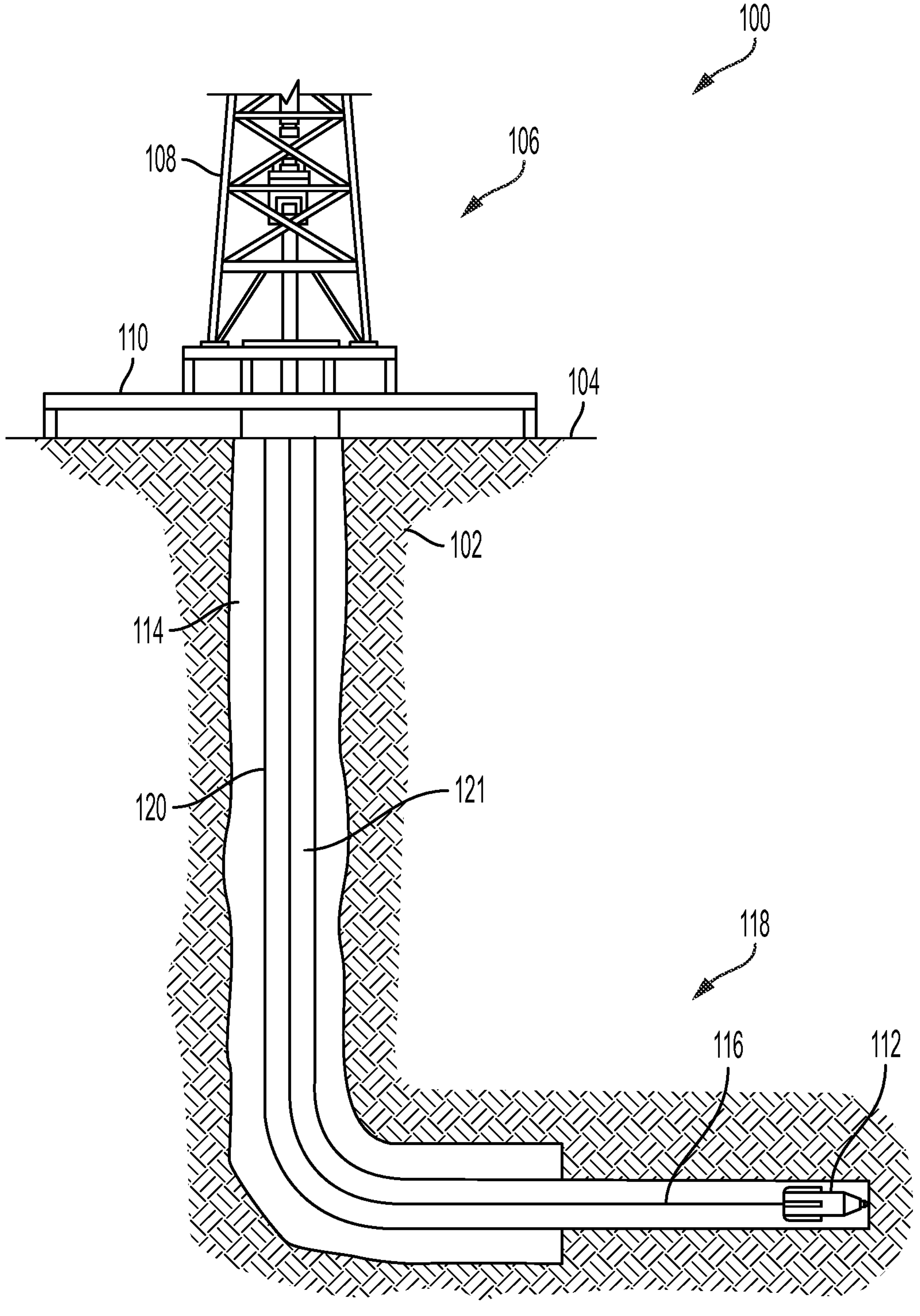
FIG. 1 is a schematic view of a wellbore operating environment for which a model preference optimizer may be deployed, according to various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

This disclosure provides techniques for optimizing trained models using preference learning and, in some examples, based on live data received from downhole sensors and/or treated by one or more receiving trained models. As a result, optimum parameters, such as weight on bit (WOB) and rotations per minute (RPM) of a drillbit, can be tuned according to range constraints to predict, for example and without imputing limitation, a rate of penetration (ROP) of the drillbit (e.g., as it is expanding a wellbore, etc.).

In particular, a probability function for selecting a model to apply to downhole sensor data can be maximized using preference learning based on inputs provided by a user. As discussed in this disclosure, a model selection pool includes a linear model and a non-linear model. However, it will be understood by a person having ordinary skill in the art with benefit of this disclosure that more than two models may be in the model selection pool and/or models may be of other construction such as neural network models, logistic regression models, categorical models, and the like without departing from the spirit of this disclosure.

Selecting between, for example, the linear model and the non-linear model may be performed by a model-based Bayesian optimizer and according to a probability model that incorporates preference learning. In effect, the model-based optimizer may adjust model selection biases (e.g., prior probabilities) in response to a user exhibiting a selection preference via real time inputs.

In one example, a parameter space (including WOB and RPM), various engineering constraints (e.g., control limiters and the like), and an objective function based on ROP can be provided to the optimizer as inputs. The optimizer may then receive an observation (e.g., WOB and/or RPM sensor data) and evaluate the ROP with the objective function (e.g., the linear and non-linear models). A store of sample points and a log of observations may then be updated accordingly and a -stoachastic based (e.g., Bayesian) optimizer may be run on the updated sample points, observation log, and evaluated ROP. The optimizer may include outputting an optimum WOB and/or RPM according to each objective function. A selection between the output optimums then be recorded and used to inform naïve parameter optimizations (e.g., respective to each particular objective function/model) and a model preference (e.g., adjusting one or more model selection biases, etc.).

In particular, a logistic regression may be used as a classifier for the model-based optimizer. For example, the model-based optimizer may include a probability model for selecting between the linear and non-linear models (e.g., model selection biases, etc.) for various parameters. A preference for the ROP can be computer from a applying the optimizer to a tuple including the WOB, RPM, and the linear or the non-linear model respectively. In effect, a probability model is built based on, in one example and without imputing limitation, a logistic regression for the preference. Accordingly, the preference may then be maximized using a Bayesian approach for each of the linear model and the non-linear model.

$$ROP=k(WOB*RPM) \quad (1)$$

$$ROP=k(WOB*RPM)^a \quad (2)$$

Equation 1 above is one example, without imputing limitation, of a linear model for predicting rate of penetration (ROP) from a linear modeling function with k fitted with the received weight on bit (WOB) and rotations per minute (RPM). In comparison, equation 2 above is one example, without imputing limitation, of a non-linear model for predicting ROP from a power law modeling function with k and the exponent a fitted with the received WOB and RPM. The preference for selecting the linear (equation 1) or non-linear (equation 2) model may be, for example and without imputing limitation, described by equation 3 below:

$$P = \frac{e^{\beta_0+\beta_1 WOB+\beta_1 RPM+\beta_3 Model}}{1+e^{\beta_0+\beta_1 WOB+\beta_1 RPM+\beta_3 Model}} \quad (3)$$

In effect, the preference, P, can be maximized based on WOB, RPM, and model selection, Model, given a learned user preference using Bayesian optimization. $\beta_0$, $\beta_1$, $\beta_2$, and $\beta_3$ are preference weights (e.g., prior probabilities, etc.) and can be obtained from iterating preference selections for respective models (e.g., linear and non-linear, etc.). For example, model preferences can be updated as a user selects one or another model prediction according to an observed WOB and/or RPM value. Table 1 below shows, in chronological order as received from downhole sensors, associated models, WOB values, RPM values, and model preference (e.g., probability) values. In particular, the preference values may be updated as a user indicates for one or another model output in relation to observed WOB and RPM values.

TABLE 1

| Model | WOB | RPM | Probability |
|---|---|---|---|
| Linear | 13.68924 | 178.4476 | 0.8 |
| Non-linear | 16.38341 | 179.7883 | 0.9 |
| Non-linear | 15.50201 | 179.7119 | 0.95 |
| Linear | 21.59175 | 143.9318 | 0.3 |
| Non-linear | 10.69351 | 179.3086 | 0.83 |
| Linear | 16.33569 | 180 | 0.7 |
| Linear | 16.00564 | 180 | 0.3 |
| Linear | 12.64623 | 178.2455 | 0.4 |
| Linear | 11.17291 | 179.0541 | 0.5 |

TABLE 1-continued

| Model | WOB | RPM | Probability |
|---|---|---|---|
| Linear | 11.65077 | 179.5883 | 0.29 |
| Non-linear | 10.22600 | 179.261 | 0.85 |
| Non-linear | 10.52306 | 179.0784 | 0.87 |
| Linear | 14.45196 | 178.6586 | 0.7 |
| Non-linear | 13.31026 | 178.723 | 0.84 |
| Non-linear | 13.69158 | 180 | 0.9 |

FIG. 1 illustrates a schematic view of an example of a wellbore operating environment for which a model preference learning and optimization system may be deployed. As depicted in FIG. 1, the operating environment 100 includes a wellbore 114 that penetrates a subterranean formation 102 that includes a plurality of formation zones 2, 4, 6, and 8 for the purpose of recovering hydrocarbons, storing hydrocarbons, disposing of carbon dioxide, or the like. The wellbore 114 may extend substantially vertically away from the Earth's surface over a vertical wellbore portion, or may deviate at any angle from the Earth's surface 104 over a deviated or horizontal wellbore portion 118. In alternative operating environments, portions or substantially all of the wellbore 114 may be vertical, deviated, horizontal, and/or curved. The wellbore 114 may be drilled into the subterranean formation 102 using any suitable drilling technique. In some examples, a drilling or servicing rig 106 disposed at the surface 104 can include a derrick 108 with a rig floor 110 through which a tubular string (e.g., a drill string, a tool string, a segmented tubing string, a jointed tubing string, or any other suitable conveyance, or combinations thereof) generally defining an axial flowbore may be positioned within or partially within the wellbore 114. In some examples, the tubular strings may include two or more concentrically positioned strings of pipe or tubing (e.g., a first work string may be positioned within a second work string). The drilling or servicing rig 106 may be conventional and may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string may be utilized in drilling, stimulating, completing, or otherwise servicing the wellbore, or combinations thereof.

While FIG. 1 depicts a stationary drilling rig 106, one of ordinary skill in the art will readily appreciate that mobile workover rigs, wellbore servicing units (such as coiled tubing units), and the like may be employed. It is noted that while the FIGs. or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. Therefore, the horizontal, deviated, or vertical nature of any figure is not to be construed as limiting the wellbore to any particular configuration.

As depicted in FIG. 1, at least a portion of the wellbore 114 is lined with a wellbore tubular 120 such as a casing string and/or liner defining an axial flowbore 121. Additionally, an unlined portion 116 of the wellbore 114 is uncased and generally exposed to the surrounding wellbore environment. The unlined portion 116 is a most recent drilled portion of the wellbore 114 and has yet to undergo a casing procedure or the like. Overall, the shape and direction of the wellbore 114 is determined by the traversal and orientation of a drill bit 112 which is controlled at the stationary drilling rig 106 via a drillstring 116. Various sensors, onboard controllers, and/or tools may be attached to, or positioned along, the drillstring 116. In some examples, control signals may be transmitted over the drillstring 116 to the drill bit 112 (e.g., to modify adjustable parameters such as weight on bit (WOB), rotations per minute (RPM), etc.) in order to achieve a desired drilling state (e.g., a particular rate of penetrations (ROP) or the like). Likewise, sensor signals and/or feedback from the drill bit 112 may be transmitted up to the stationary drilling rig 106 via the drillstring 116 for further processing (e.g., logging, processing by supporting processes such as formation modeling processes, etc.).

Figure 2:
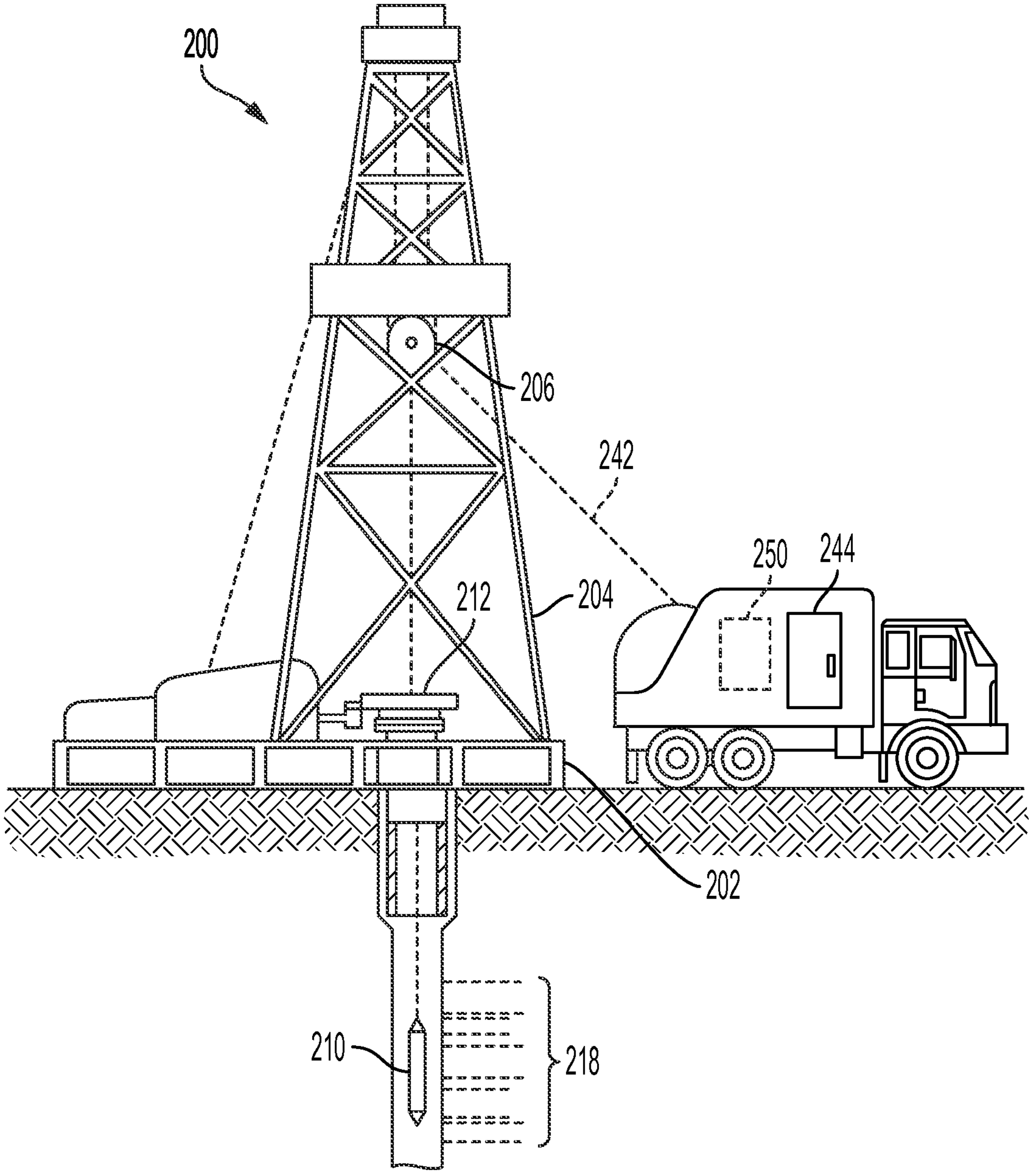
FIG. 2 is a schematic diagram of an example conveyance drilling environment, according to various embodiments of the subject technology.

FIG. 2 illustrates a diagrammatic view of a conveyance logging (WL) borehole operating environment 200 (also referred to as "wireline" in the field) in which the present disclosure can be implemented. A hoist 206 can be included as a portion of a platform 202 which is coupled to a derrick 204. The hoist 206 may be used to raise or lower equipment such as tool 210 into or out of a borehole. A conveyance 242 provides a communicative coupling between tool 210 and a facility 244 at the surface. Conveyance 242 may be a tubular conveyance such as coiled tubing, joint tubing, or other tubulars, and may include wires (one or more wires), slicklines, cables, or the like, as well as a downhole tractor. Additionally, power can be supplied via the conveyance 242 to meet power requirements of the tool. Tool 210 may have a local power supply, such as batteries, downhole generator and the like. When employing non-conductive cable, coiled tubing, pipe string, or downhole tractor, communication may be supported using, for example, wireless protocols (e.g., EM, acoustic, etc.), and/or measurements and logging data can be stored in local memory for subsequent retrieval. Facility 244 may include a computing device 250 able to communicate with the devices and systems of the present disclosure.

Figure 3:
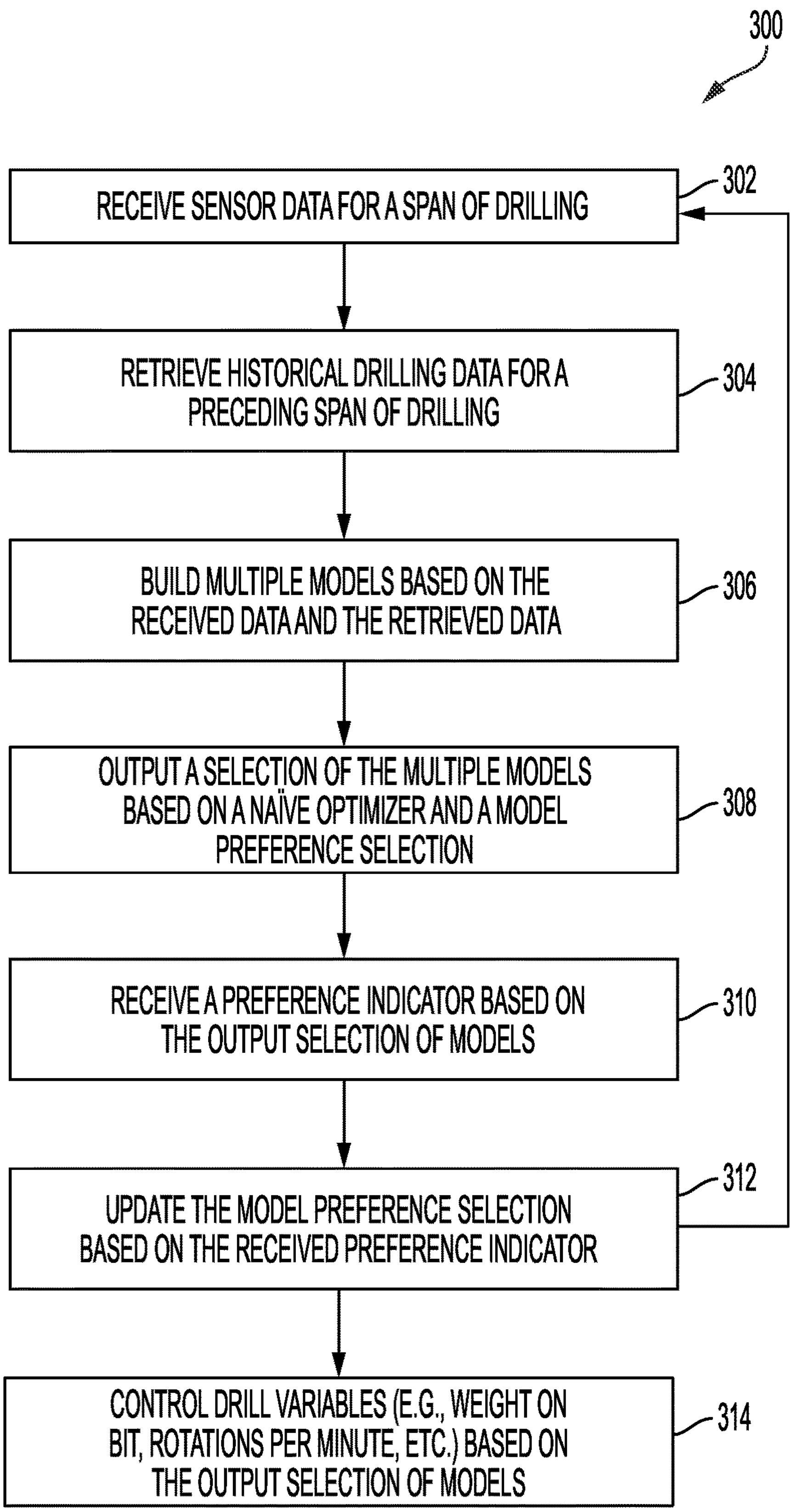
FIG. 3 is a flowchart of a method for controlling a drill through a preference optimized model, according to various embodiments of the subject technology.

FIG. 3 is a flowchart of an example method 300 for controlling adjustable drill variables (e.g., RPM, WOB, etc.). Here, method 300 can be used to optimize a ROP (e.g., to hasten the drilling process, etc.) by applying a selected model for predicting a ROP based on user preference. While examples disclosed herein are in the context of ROP predicted by RPM, WOB, etc., it will be understood by those of ordinary skill in the art with the benefit of this disclosure that the methods and systems disclosed herein, such as method 300, may be applied to other adjustable drill variables and/or other predicted variables without departing from the spirit of the disclosure.

At step 302, sensor data is received for a span of drilling. For example, a computer at the stationary drilling rig 106 and/or the facility 244 may receive information from sensors onboard the drill bit 112 via the drillstring 116. In some examples, the sensor data includes weight on bit (WOB) and rotations per minute (RPM) information for the drill bit 112.

At step 304, historical drilling data is retrieved for a preceding span of drilling. In some examples, the historical drilling data includes log data for the sensors onboard the drill bit 112 (e.g., WOB and RPM) and the preceding span of drilling is an immediately preceding drill distance or time. The historical drilling data may be stored in a data store onsite (e.g., at the stationary drilling rig 106) or at a remote server, cloud provider, or the like.

At step 306, multiple models (e.g., a linear model and a non-linear model) can be built based on the received data and the retrieved data. Each respective model may predict the rate of penetration (ROP) of the drill bit 112 based on WOB and ROP values.

At step 308, a selection of the multiple models is output based on a naïve optimizer and model preference selection. In some examples, the naïve optimizer adjusts predicted variables, such as ROP, according to optimization procedures native to the respective model or library used to construct the model. The model preference selection may include, for example and without imputing limitation, a bias or weight for selecting a particular model over other models based on historical user preference and/or WOB, RPM, or other adjustable drill variables.

At step 310, a preference indicator is received based on the output selection of models. For example, the selection of models may be output to a user via a computer interface (e.g., graphical user interface, command line interface, etc.) and prompt the user for a selection between competing models or a preference value for (e.g., a confidence level in) a particular model or the like.

At step 312, the model preference selection is updated based on the received indicator. In some examples, associated probabilities or weights for the selected model are increased or decreased in proportion to the received indicator. In some examples, the method 300 loops and appends the received sensor data to the historical drilling data. As a result, the method 300 continues to loop while drilling ensues and the entire method may be performed in real time.

At step 314, drill variables (e.g., WOB, RPM, and/or adjustable drill variables) are controlled based on the output selection of models. For example, the WOB and/or the RPM of the drill bit 112 may be adjusted in order to achieve a particular ROP predicted by the output selection of models.

Figure 4:
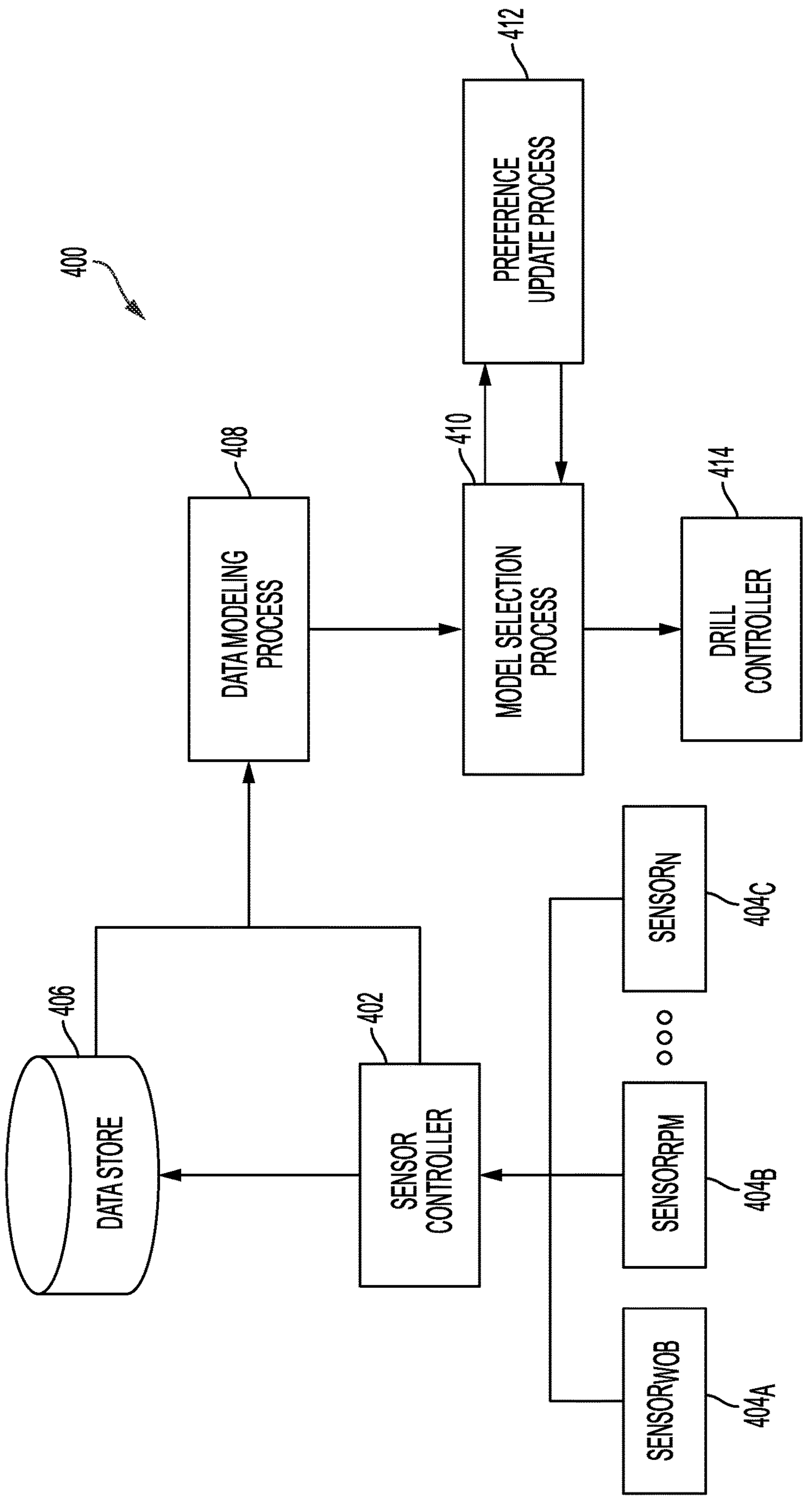
FIG. 4 is a block diagram of a system for updating a model preference, according to various embodiments of the subject technology.

FIG. 4 is block diagram of a system 400 for controlling a drill bit (e.g., the drill bit 112) based on learned preferences for models. System 400 may perform method 300 discussed above. In some examples, system 400 may integrated into wellbore operating environment 100 and/or conveyance drilling environment 200, respectively discussed above.

In particular, a sensor controller 402 receives information from one or more downhole sensors 404A-C. Sensors 404A-C may be located anywhere on, for example, the drillstring 116. Here, WOB sensor 404A and RPM sensor 404B are located onboard the drill bit 112. In some examples, the WOB sensor 404A and the RPM sensor 404B may be located on the drillstring 116 above the drill bit 112 (e.g., "upstring"). Nevertheless, the sensors 404A-C provide data, either in response to a request or according to a schedule or the like, to the sensor controller 402.

The sensor controller 402 provides the sensor data received from the sensors 404A-C upstream to a data store 406, where the sensor data may be stored as a log. The data store 406 may be a local database (e.g., maintained in computer memory or the like) or provided as a remote server or cloud service and accessed over a network (e.g., the Internet, a virtual private network (VPN), local area network (LAN), etc.). In some examples, various external services and/or processes may retrieve the log from the data store 406 to, for example and without imputing limitation, perform additional modeling activities, observability processes, monitoring activities, and the like.

The sensor controller 402 may also forward sensor data from sensor 404A-C to a data modeling process 408. Further, the data modeling process 408 retrieves the log data from the data store 406. The data modeling process 408 uses the forwarded sensor data and the log data to generate and/or apply multiple models for predicting a particular value such as, for example and without imputing limitation, a ROP value of the drill bit 112. The data modeling process 408 then transmits the multiple models to a model selection process 410.

The model selection process 410 includes a preference store for selecting between multiple models provided by the data modeling process 408. In some examples, the preference store may include one or more preference weights or probabilities for selecting respective models. In some examples, the preference store may include a preference model which learns a user preference over a period of time and can apply the learned preference to the multiple models in order to select a particular model. Nevertheless, the model selection process 410 interfaces with a preference update process 412 and a drill controller 414.

The model selection process 410 provides the selected model to the drill controller 414 for controlling the drill bit 112 based on the selected model. In some examples, the drill controller 414 includes additional processes and/or services for interpreting the selected model (not depicted). For example, the drill controller 414 may adjust the WOB for the drill bit 112 in order to achieve a particular ROP predicted by the particular model. In effect, ROP and likewise predicted values can be achieved through a modeling and model selection process incorporating user preference and experiential knowledge.

Further, the model selection process 410 provides to the preference update process 412 a collection of one or more models received from the data modeling process 408. The preference update process 412 can include various interfaces displayed on, for example and without imputing limitation, a monitor display or the like. the preference update process receives a user input indicating a preference value for one of the collection of one or more models. The indicated preference value may then be provided to the model selection process 410 for preference learning. For example, a preference learning sub-process or service may update a preference model or the like based on the indicated value. As a result, the model selection process 410 may select models increasingly according to a user preference over a series of iterations.

Figure 5:
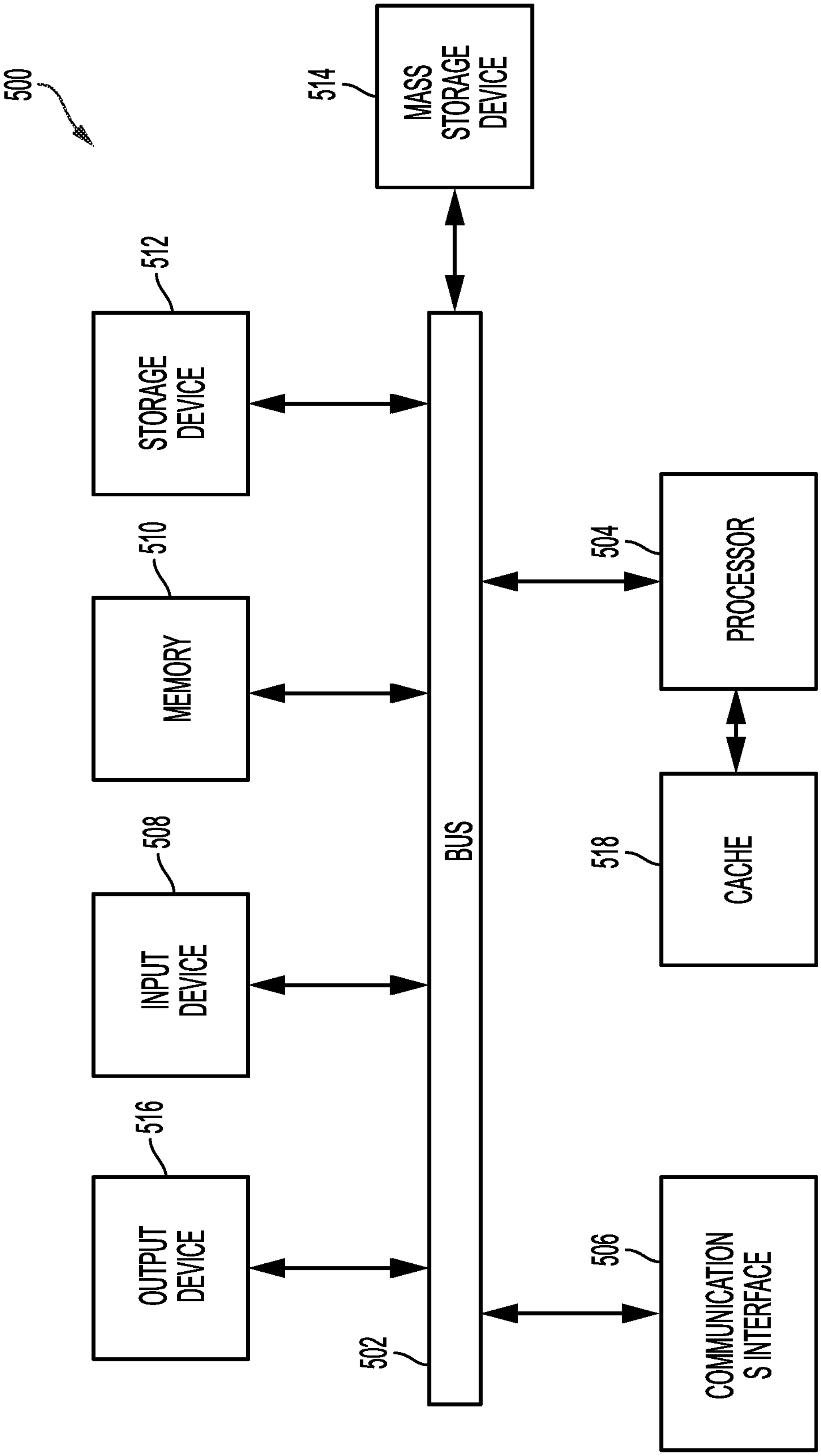
FIG. 5 is a system diagram illustrating a computing system, in accordance with various embodiments of the subject technology.

FIG. 5 is a schematic diagram of a computing system 500 that may implement various systems and methods discussed herein. The computing system 500 includes one or more computing components in communication via a bus 502. In one embodiment, the computing system 500 may include one or more processes 504. The processor 504 can include one or more internal levels of cache 518 and a bus controller or bus interface unit to direct interaction with the bus 502. The processor 504 can specifically implement the various methods discussed herein. Memory 510 may include one or more memory cards and a control circuit, or other forms of removable memory, and can store various software applications including computer executable instructions, that when run on the processor 504 implement the methods and systems set out herein. Other forms of memory, such as a storage device 512 and a mass storage device 514, can also be included and accessible by the processor (or processors) 504 via the bus 502. The storage device 512 and mass storage device 514 can each contain any or all of the methods and systems, in whole or in part, discussed herein. In some examples, the storage device 512 or the mass storage device 514 can provide a database or repository in order to store data as discussed below.

The computing system 500 can further include a communications interface 506 by way of which the computing system 500 can connect to networks and receive data useful in executing the methods and systems set out herein as well as transmitting information to other devices. The computer system 500 can also include an input device 508 by which information is input. Input device 508 can be a scanner, keyboard, and/or other input devices as will be apparent to a person of ordinary skill in the art. The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Numerous examples are provided herein to enhance understanding of the present disclosure. A specific set of statements are provided as follows:

Statement 1: A method for generating a predicted value includes receiving one or more input signals, generating a first predicted value by applying a first set of weights from a first predictive model to the one or more input signals, generating a second predicted value by applying a second set of weights from a second predictive model to the one or more input signals, calculating a preference probability for one of the first predictive model or the second predictive model through a preference regression model having a third set of weights, the third set of weights applied to the one or more input signals and model identification value, receiving an observed value corresponding to the one or more input signals, and updating a list of sample points with the one or more input signals and the corresponding observed value, generating a first set of optimum controllable values with the first predictive model, generating a second set of optimum controllable values with the second predictive model, receiving a preference value indicating a preference for the first predictive model or the second predictive model based on a comparison between one of the first predicted value and the second predicted value or the first set of optimum controllable values and the second set of optimum controllable values, updating the first set of weights based on the list of sample points using a first naïve optimizer associated with the first predictive model, updating the second set of weights based on the list of sample points using a second naïve optimizer associated with the second predictive model, and updating the third set of weights based on received preference value using a preference value optimizer associated with the preference regression model.

Statement 2: The method of preceding Statement 1 further includes displaying, on a user interface, one or more of the first predicted value and the second predicted value or the first set of optimum controllable values and the second set of optimum controllable values, and receiving the preference value as user input.

Statement 3: The method of any of the preceding Statements further includes including one or more additional predictive models.

Statement 4: The method of any of the preceding Statements includes the list of sample points used to update the first set of weights or the second set of weights being one of a list of historical sample points or a list of most recently updated sample points.

Statement 5: The method of any of the preceding Statements includes the preference regression model including a logistic regression model.

Statement 6: The method of any of the preceding Statements includes the preference value optimizer including a Bayesian optimization.

Statement 7: The method of any of the preceding Statements includes the one or more input signals being Weight on bit (WOB) and Rotations Per Minute (RPM) of a drill, and the predicted output and observed value are Rate of Penetration (ROP) of the drill.

Statement 8: A system for generating a predicted value includes one or more processors, and a memory storing instructions to receive one or more input signals, generate a first predicted value by applying a first set of weights from a first predictive model to the one or more input signals, generate a second predicted value by applying a second set of weights from a second predictive model to the one or more input signals, calculate a preference probability for one of the first predictive model or the second predictive model through a preference regression model including a third set of weights, the third set of weights applied to the one or more input signals and model identification value, receive an observed value corresponding to the one or more input signals, and update a list of sample points with the one or more input signals and the corresponding observed value, generate a first set of optimum controllable values with the first predictive model, generate a second set of optimum controllable values with the second predictive model, receive a preference value indicating a preference for the first predictive model or the second predictive model based on a comparison between one of the first predicted value and the second predicted value or the first set of optimum controllable values and the second set of optimum controllable values, update the first set of weights based on the list of sample points using a first naïve weight optimizer associated with the first predictive model, update the second set of weights based on the list of sample points using a second naïve weight optimizer associated with the second predictive model, and update the third set of weights based on received preference value using a preference value optimizer associated with the preference regression model.

Statement 9: The system of preceding Statement 8 includes the memory further including instructions to display, on a user interface, one or more of the first predicted value and the second predicted value or the first set of optimum controllable values and the second set of optimum controllable, values, and receive the preference value as user input.

Statement 10: The system of any of preceding Statements 8-9 includes the memory further including instructions to include one or more additional predictive models.

Statement 11: The system of any of preceding Statements 8-10 includes the list of sample points used to update the first set of weights or the second set of weights being one of a list of historical sample points or a list of most recently updated sample points.

Statement 12: The system of any of preceding Statements 8-11 includes the preference regression model including a logistic regression model.

Statement 13: The system of any of preceding Statements 8-12 includes the preference value optimizer including a Bayesian optimization.

Statement 14: The system of any of preceding Statements 8-13 includes the one or more input signals including one or more of a weight on bit (WOB) or a rotations per minute (RPM) of a drill bit and one or more of the predicted output or the observed value is a rate of penetration (ROP) of the drill bit.

Statement 15: A non-transitory computer readable medium stores instructions that, when executed by one or more processors, cause the one or more processors to receive one or more input signals including one or more of a weight on bit (WOB) or a rotations per minute (RPM) of a drill bit, generate a first predicted value of the rate of penetration of the drill bit by applying a first set of weights from a first predictive model to the one or more input signals, generate a second predicted value of the rate of penetration of the drill bit by applying a second set of weights from a second predictive model to the one or more input signals, calculate a preference probability for one of the first predictive model or the second predictive model by applying a preference regression model to the one or more input signals and respective model identification values, the preference regression model including a third set of weights, receive an observed value of a rate of penetration (ROP) of the drill bit corresponding to the one or more input signals, and update a list of sample points with the one or more input signals and the corresponding observed value, generate a first set of optimum controllable values including one of the WOB or the RPM of the drill bit with the first predictive model, generate a second set of optimum controllable values including one of the WOB or the RPM of the drill bit with the second predictive model, receive a preference value indicating a preference for the first predictive model or the second predictive model based on a comparison between one of the first predicted value and the second predicted value or the first set of optimum controllable values and the second set of optimum controllable values, update the first set of weights based on the list of sample points using a first naïve optimizer associated with the first predictive model, update the second set of weights based on the list of sample points using a second naïve optimizer associated with the second predictive model, update the third set of weights based on the received preference value using a preference value optimizer associated with the preference regression model.

Statement 16: The non-transitory computer readable medium of preceding Statement 15 further stores instructions to display, on a user interface, one or more of the first predicted value and the second predicted value or the first set of optimum controllable values and the second set of optimum controllable values, and receive the preference value as user input.

Statement 17: The non-transitory computer readable medium of any of preceding Statements 15-16 further stores instructions to include one or more additional predictive models.

Statement 18: The non-transitory computer readable medium of any of preceding Statements 15-17 includes the list of sample points used to update one of the first set of weights or the second set of weights being one of a list of historical sample points or a list of most recently updated sample points.

Statement 19: The non-transitory computer readable medium of any of preceding Statements 15-18 includes the preference regression model including a logistic regression model.

Statement 20: The non-transitory computer readable medium of any of preceding Statements 15-19 includes the preference value optimizer including a Bayesian optimization.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A method for generating a predicted value, the method comprising:

receiving one or more input signals;

generating a first predicted value by applying a first set of weights from a first predictive model to the one or more input signals;

generating a second predicted value by applying a second set of weights from a second predictive model to the one or more input signals;

calculating a preference probability for one of the first predictive model or the second predictive model through a preference regression model comprising a third set of weights, the third set of weights applied to the one or more input signals and a model identification value;

receiving an observed value corresponding to the one or more input signals, and updating a list of sample points with the one or more input signals and the corresponding observed value;

generating a first set of optimum controllable values with the first predictive model;

generating a second set of optimum controllable values with the second predictive model;

receiving a preference value indicating a preference for the first predictive model or the second predictive model based on a comparison between one of the first predicted value and the second predicted value or the first set of optimum controllable values and the second set of optimum controllable values;

updating the first set of weights based on the list of sample points using a first naïve optimizer associated with the first predictive model;

updating the second set of weights based on the list of sample points using a second naïve optimizer associated with the second predictive model;

updating the third set of weights based on the received preference value using a preference value optimizer associated with the preference regression model; and controlling a drill associated with the one or more input signals based on an output of either the first predictive model or the second predictive model selected through application of the preference regression model with the updated third set weights to affect the preference probability for one of the first predictive model and the second predictive model.

2. The method of claim 1, further comprising:

displaying, on a user interface, one or more of the first predicted value and the second predicted value or the first set of optimum controllable values and the second set of optimum controllable values; and receiving the preference value as user input.

3. The method of claim 1, further comprising including one or more additional predictive models.

4. The method of claim 1, wherein the list of sample points used to update the first set of weights or the second set of weights is one of a list of historical sample points or a list of most recently updated sample points.

5. The method of claim 1, wherein the preference regression model comprises a logistic regression model.

6. The method of claim 1, wherein the preference value optimizer comprises a Bayesian optimization.

7. The method of claim 1, wherein the one or more input signals are Weight on bit (WOB) and Rotations Per Minute (RPM) of a drill, and the predicted output and observed value are Rate of Penetration (ROP) of the drill.

8. A system for generating a predicted value comprising:

one or more processors; and a memory storing instructions to:

receive one or more input signals;

generate a first predicted value by applying a first set of weights from a first predictive model to the one or more input signals;

generate a second predicted value by applying a second set of weights from a second predictive model to the one or more input signals;

calculate a preference probability for one of the first predictive model or the second predictive model through a preference regression model comprising a third set of weights, the third set of weights applied to the one or more input signals and a model identification value;

receive an observed value corresponding to the one or more input signals, and update a list of sample points with the one or more input signals and the corresponding observed value;

generate a first set of optimum controllable values with the first predictive model;

generate a second set of optimum input values with the second predictive model;

receive a preference value indicating a preference for the first predictive model or the second predictive model based on a comparison between one of the first predicted value and the second predicted value or the first set of optimum controllable values and the second set of optimum controllable values;

update the first set of weights based on the list of sample points using a first naïve optimizer associated with the first predictive model;

update the second set of weights based on the list of sample points using a second naïve optimizer associated with the second predictive model;

update the third set of weights based on the received preference value using a preference value optimizer associated with the preference regression model; and control a drill associated with the one or more input signals based on an output of either the first predictive model or the second predictive model selected through application of the preference regression model with the updated third set weights to affect the preference probability for one of the first predictive model and the second predictive model.

9. The system of claim 8, wherein the memory further comprises instructions to:

display, on a user interface, one or more of the first predicted value and the second predicted value or the first set of optimum controllable values and the second set of optimum controllable values; and receive the preference value as user input.

10. The system of claim 8, wherein the memory further comprises instructions to include one or more additional predictive models.

11. The system of claim 8, wherein the list of sample points used to update the first set of weights or the second set of weights is one of a list of historical sample points or a list of most recently updated sample points.

12. The system of claim 8, wherein the preference regression model comprises a logistic regression model.

13. The system of claim 8, wherein the preference value optimizer comprises a Bayesian optimization.

14. The system of claim 8, wherein the one or more input signals comprises one or more of a weight on bit (WOB) or a rotations per minute (RPM) of a drill bit and one or more of the predicted output or the observed value is a rate of penetration (ROP) of the drill bit.

15. A non-transitory computer readable medium storing instructions that, when executed by one or more processors, cause the one or more processors to:

receive one or more input signals comprising one or more of a weight on bit (WOB) or a rotations per minute (RPM) of a drill bit;

generate a first predicted value of the rate of penetration of the drill bit by applying a first set of weights from a first predictive model to the one or more input signals;

generate a second predicted value of the rate of penetration of the drill bit by applying a second set of weights from a second predictive model to the one or more input signals;

calculate a preference probability for one of the first predictive model or the second predictive model by applying a preference regression model to the one or more input signals and respective model identification values, the preference regression model comprising a third set of weights;

receive an observed value of a rate of penetration (ROP) of the drill bit corresponding to the one or more input signals, and update a list of sample points with the one or more input signals and the corresponding observed value;

generate a first set of optimum controllable values comprising of one of the WOB or the RPM of the drill bit with the first predictive model;

generate a second set of optimum controllable values comprising of one of the WOB or the RPM of the drill bit with the second predictive model;

receive a preference value indicating a preference for the first predictive model or the second predictive model based on a comparison between one of the first predicted value and the second predicted value or the first set of optimum controllable values and the second set of optimum controllable values;

update the first set of weights based on the list of sample points using a first naïve optimizer associated with the first predictive model;

update the second set of weights based on the list of sample points using a second naïve optimizer associated with the second predictive model;

update the third set of weights based on the received preference value using a preference value optimizer associated with the preference regression model; and control a drill associated with the one or more input signals based on an output of either the first predictive model or the second predictive model selected through application of the preference regression model with the updated third set weights to affect the preference probability for one of the first predictive model and the second predictive model.

16. The non-transitory computer readable medium of claim 15, further storing instructions to:

display, on a user interface, one or more of the first predicted value and the second predicted value or the first set of optimum controllable values and the second set of optimum controllable values; and receive the preference value as user input.

17. The non-transitory computer readable medium of claim 15, further storing instructions to include one or more additional predictive models.

18. The non-transitory computer readable medium of claim 15, wherein the list of sample points used to update one of the first set of weights or the second set of weights is one of a list of historical sample points or a list of most recently updated sample points.

19. The non-transitory computer readable medium of claim 15, wherein the preference regression model comprises a logistic regression model.

20. The non-transitory computer readable medium of claim 15, wherein the preference value optimizer comprises a Bayesian optimization.

* * * * *